(12) United States Patent
Yamasaki

(10) Patent No.: US 9,937,660 B2
(45) Date of Patent: Apr. 10, 2018

(54) CARTRIDGE AND METHOD FOR MANUFACTURING CARTRIDGE

(71) Applicant: CANON KABUSHIKI KAISHA, Tokyo (JP)

(72) Inventor: Toshiteru Yamasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 193 days.

(21) Appl. No.: 14/810,247

(22) Filed: Jul. 27, 2015

(65) Prior Publication Data

US 2016/0033932 A1 Feb. 4, 2016

(30) Foreign Application Priority Data

Aug. 1, 2014 (JP) ................. 2014-157756

(51) Int. Cl.
| | |
|---|---|
| G03G 15/08 | (2006.01) |
| G03G 21/18 | (2006.01) |
| B29C 65/16 | (2006.01) |
| B29C 65/48 | (2006.01) |
| B29C 65/50 | (2006.01) |
| B29C 65/00 | (2006.01) |

(Continued)

(52) U.S. Cl.
CPC ........ *B29C 65/1635* (2013.01); *B29C 65/168* (2013.01); *B29C 65/1616* (2013.01); *B29C 65/1658* (2013.01); *B29C 65/1683* (2013.01); *B29C 65/4815* (2013.01); *B29C 65/5057* (2013.01); *B29C 66/1122* (2013.01); *B29C 66/43* (2013.01); *B29C 66/5326* (2013.01); *B29C 66/81457* (2013.01); *B41J 2/17559* (2013.01); *G03G 15/0817* (2013.01); *G03G 21/1825* (2013.01); *B29C 66/71* (2013.01);

*B29C 66/919* (2013.01); *B29C 66/939* (2013.01); *B29L 2031/7678* (2013.01)

(58) Field of Classification Search
CPC .......... G03G 15/0817; G03G 15/0841; G03G 15/0843; G03G 15/0882; G03G 15/0884; G03G 15/0894; G03G 15/0898; G03G 21/181; G03G 21/1828; G03G 2215/00987; G03G 2215/00991; G03G 2215/0687; G03G 2215/069; G03G 2215/0855; G03G 2215/0861; G03G 2215/0863; G03G 2215/0877; G03G 2215/088; G03G 2215/0883; G03G 2221/1648

See application file for complete search history.

(56) References Cited

FOREIGN PATENT DOCUMENTS

| | | | | |
|---|---|---|---|---|
| EP | 1132783 A2 * | 9/2001 | ......... | G03G 15/0894 |
| JP | 2001-249603 A | 9/2001 | | |
| JP | 2013-101267 A | 5/2013 | | |

* cited by examiner

*Primary Examiner* — Joseph S Wong
(74) *Attorney, Agent, or Firm* — Canon USA, Inc. I.P. Division

(57) ABSTRACT

A method for manufacturing a cartridge attachable to and detachable from a main body of an image forming apparatus, includes preparing a unit that includes a frame including a developer storage unit storing developer and an opening connecting to the outside from the developer storage unit, and a first sheet member, one edge of which is attached to the frame, arranging a connecting member on the first sheet member, fixing a second sheet member to the first sheet member via the connecting member, and attaching a rotation member onto the opening so that the rotation member abuts on the second sheet member.

18 Claims, 16 Drawing Sheets

(51) Int. Cl.
*B41J 2/175* (2006.01)
*B29L 31/00* (2006.01)

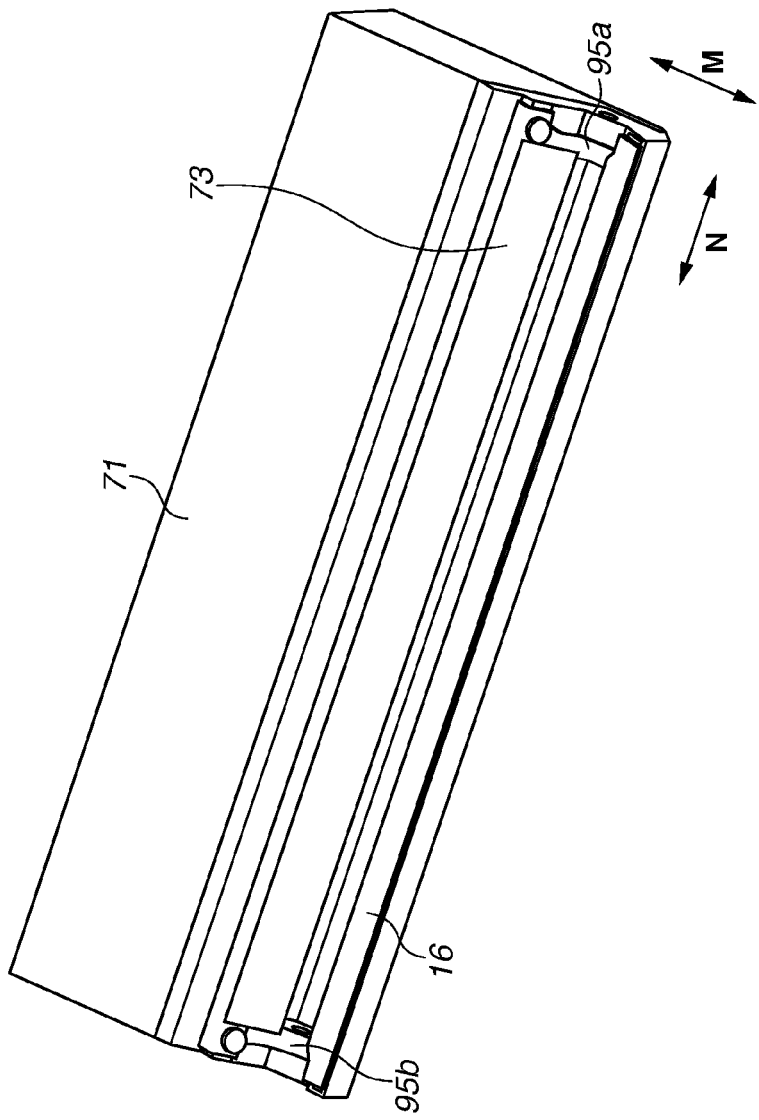

C – C CROSS SECTION

FIG.11
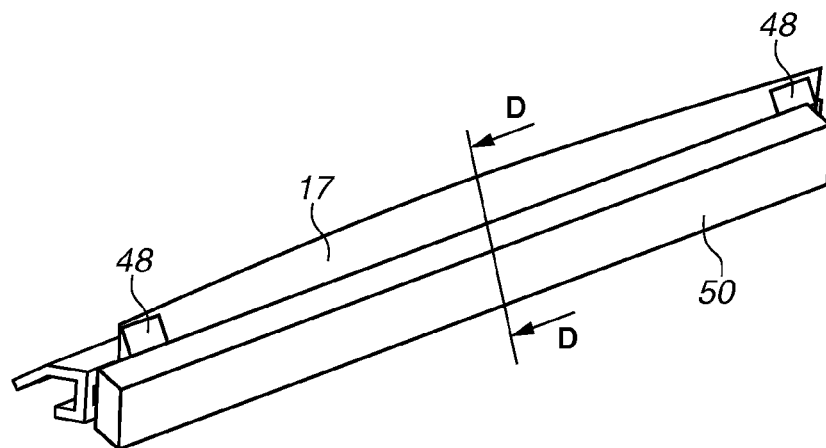
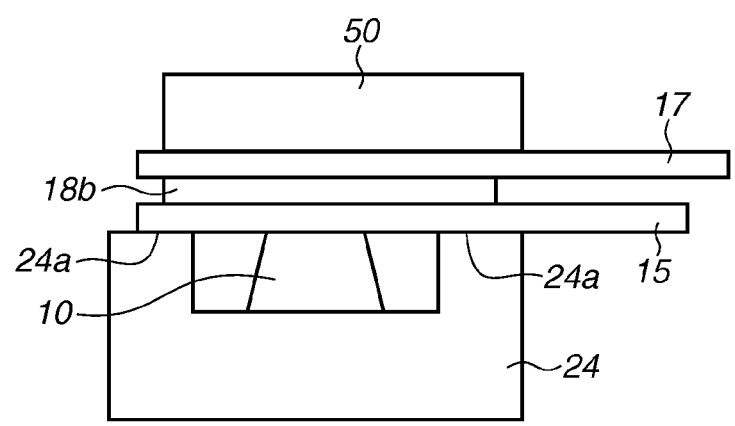
D – D CROSS SECTION

CARTRIDGE AND METHOD FOR MANUFACTURING CARTRIDGE

BACKGROUND OF THE INVENTION

Field of the Invention

The present invention relates to a cartridge attachable to and detachable from an electrophotographic image forming apparatus and a method for manufacturing the cartridge.

Description of the Related Art

The present invention relates to a process cartridge (hereinafter referred to as "cartridge") attachable to and detachable from an electrophotographic image forming apparatus and a method for reproducing the cartridge. The electrophotographic image forming apparatus (hereinafter referred to as "image forming apparatus") forms an image on a recording material (recording medium) using an electrophotographic image forming process. Examples of the image forming apparatus include a printer (a laser beam printer, a light emitting diode (LED) printer, etc.), a copying machine, a facsimile apparatus, a word processor, and a multifunction peripheral (a multifunction printer).

Conventionally, in an electrophotographic image forming apparatus, a system for integrally unitizing an image bearing member (electrophotographic photoconductor) and a process unit, acting on the image bearing member, into a cartridge and detachably attaching the cartridge to a main body of an image forming apparatus has been adopted.

In such a cartridge, an image is formed on a recording medium using toner (developer). Thus, the toner is being consumed as the images are being formed. When the toner stored in the cartridge has been consumed and an image of a quality that can satisfy a user cannot be formed, a commercial value of the cartridge is lost.

A simple cartridge reproduction method capable of commercializing again a cartridge, commercial value of which has been lost because toner has been consumed, has been desired, and has been devised (see Japanese Patent Application Laid-Open No. 2001-249603).

Further, in the cartridge, there is a gap between a frame that stores toner (developer) and the electrophotographic photoconductor. Thus, a sheet member is attached to the frame to prevent the toner from leaking outward. In the cartridge, commercial value of which has been lost, the sheet member may swell. Thus, there may be a gap between the electrophotographic photoconductor and the sheet member, and the toner cannot be sealed.

It has been discussed a technique for stripping the sheet member from the frame and attaching a new sheet member thereto. At this time, if the sheet member is joined to a part of a resin member formed in the frame, the resin member may also be stripped when the sheet member is stripped. In this case, it is necessary to fill a space where the resin member has been formed and to form a fixing surface (seating surface) for fixing the new sheet member (see Japanese Patent Application laid-Open No. 2013-101267).

SUMMARY OF THE INVENTION

According to an aspect of the present invention, a method for manufacturing a cartridge attachable to and detachable from a main body of an image forming apparatus, includes preparing a unit that includes a frame including a developer storage unit storing developer and an opening connecting to the outside from the developer storage unit, and a first sheet member, one edge of which is attached to the frame, arranging a connecting member on the first sheet member, fixing a second sheet member to the first sheet member via the connecting member, and attaching a rotation member onto the opening so that the rotation member abuts on the second sheet member.

According to another aspect of the present invention, a cartridge attachable to and detachable from a main body of an image forming apparatus, includes a frame including a developer storage unit storing developer and an opening connecting to the outside from the developer storage unit, a rotation member rotatably supported by the frame on the opening, a first sheet member attached to the frame, and a second sheet member fixed to the first sheet member via a connecting member and abutting on the rotation member.

Further features of the present invention will become apparent from the following description of exemplary embodiments with reference to the attached drawings.

BRIEF DESCRIPTION OF THE DRAWINGS

FIG. 7 is a perspective view of a part of the development unit.

FIG. 11 illustrates a first modified example of a manufacturing method according to the first exemplary embodiment.

DESCRIPTION OF THE EMBODIMENTS

While exemplary embodiments of the present invention will be specifically described below with reference to the drawings, this is not to limit the present invention. In the following description, a longitudinal direction N of a cartridge indicates a direction of a rotational axis of an image bearing member.

(Configuration of Image Forming Apparatus Main Body)

Figure 1:
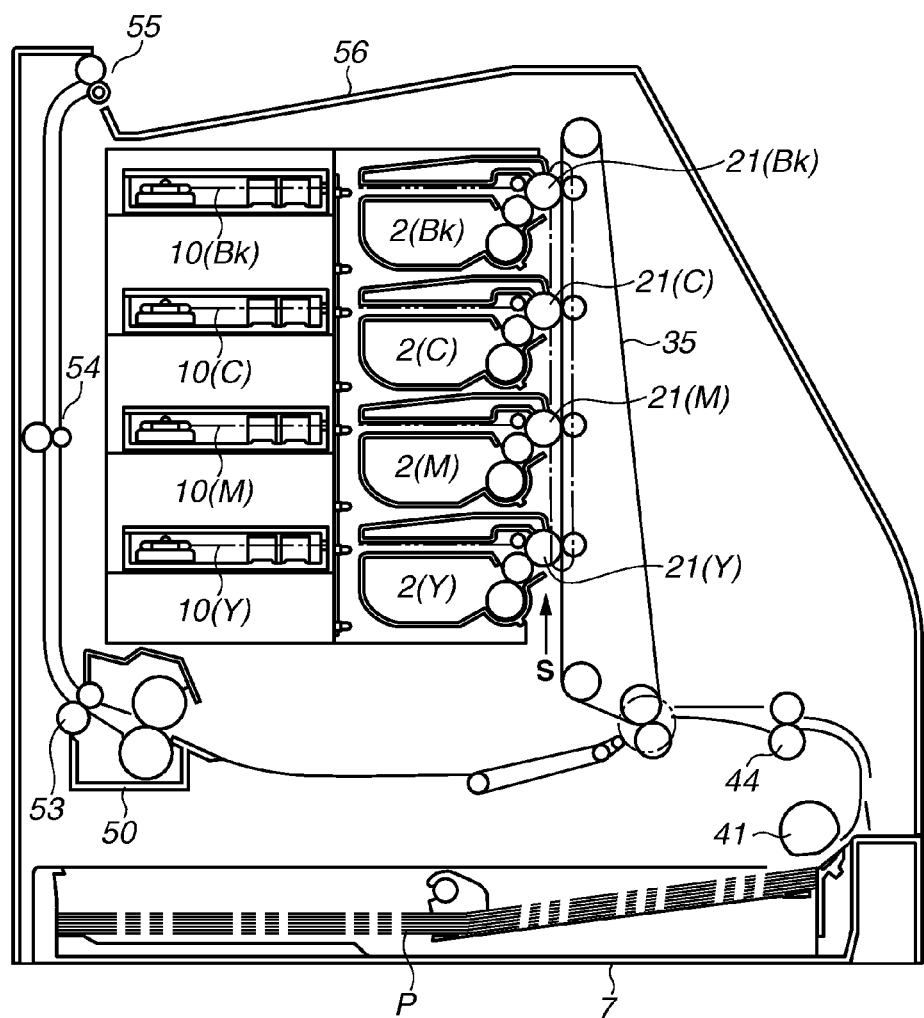
FIG. 1 is a cross-sectional view illustrating an entire configuration of an image forming apparatus.

A configuration of a main body of an image forming apparatus according to a first exemplary embodiment will be described below with reference to FIG. 1. FIG. 1 is a cross-sectional view of a color laser beam printer serving as an example of the image forming apparatus. Cartridges 2 in respective colors, i.e., yellow (Y), magenta (M), cyan (C), and black (Bk), as illustrated in FIG. 1, are attached to a main body 100 of the image forming apparatus. The cartridges 2 in the four colors are individually configured to be attachable to and detachable from the main body 100 of the image forming apparatus. Further, the main body 100 of the image forming apparatus includes an intermediate transfer member 35 that respectively transfers color images, which have been developed on image bearing members 21, onto transfer materials P, a fixing unit 50 that fixes the color images to the transfer materials P, and discharge roller groups 53, 54, and 55 that discharge the transfer materials P onto a discharge tray 56.

Next, an operation of the main body 100 of the image forming apparatus will be described below. First, a sheet feeding roller 41 rotates to separate one of the transfer materials P in a sheet feeding cassette 7 and then convey the separated transfer material P to a registration roller 44. On the other hand, the image bearing members 21 and the intermediate transfer member 35 rotate in a direction indicated by an arrow S illustrated in FIG. 1 at a predetermined outer peripheral speed V (hereinafter referred to as "process speed"). The image bearing member 21 is exposed to a beam emitted from a laser 10 after its surface is uniformly charged by a charging unit provided in the cartridge 2, thereby forming an electrostatic latent image. The electrostatic latent image is developed with toner stored in the cartridge 2, so that a visible image is formed on the image bearing member 21. The color images in the respective colors Y, M, C, Bk, which have been developed on the image bearing members 21, are primarily transferred onto the outer periphery of the intermediate transfer member 35. The images in the respective colors, which have been transferred onto the intermediate transfer member 35, are secondarily transferred onto the transfer material P, and are then fixed to the transfer material P by the fixing unit 50. The transfer material P, on which the images have been fixed, are discharged onto the discharge tray 56 via the discharge roller pairs 53, 54, and 55. Then, the image forming operation is ended.

(Configuration of Process Cartridge)

Figure 2:
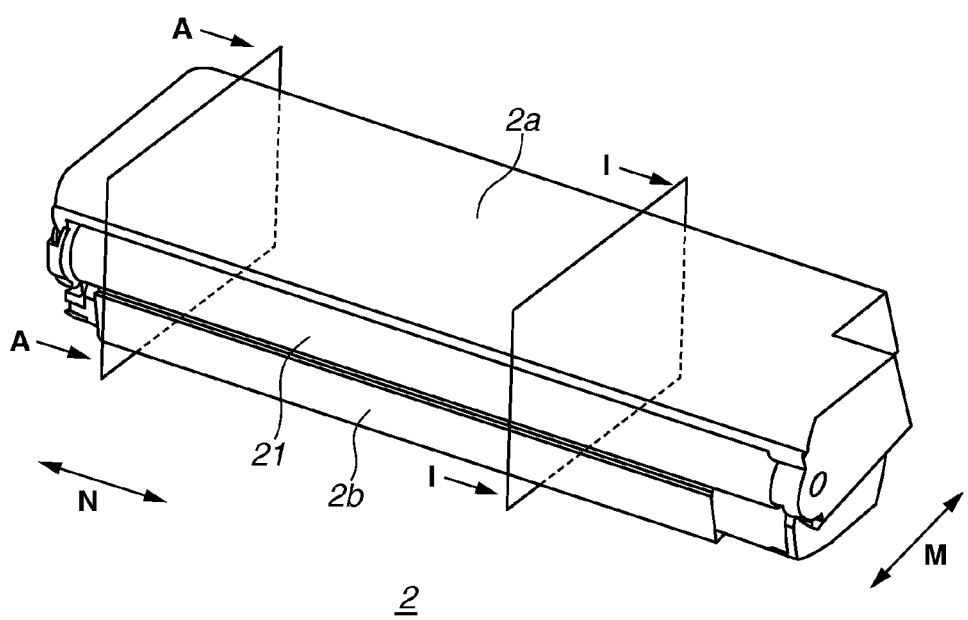
FIG. 2 is a perspective view of a cartridge.
Figure 3:
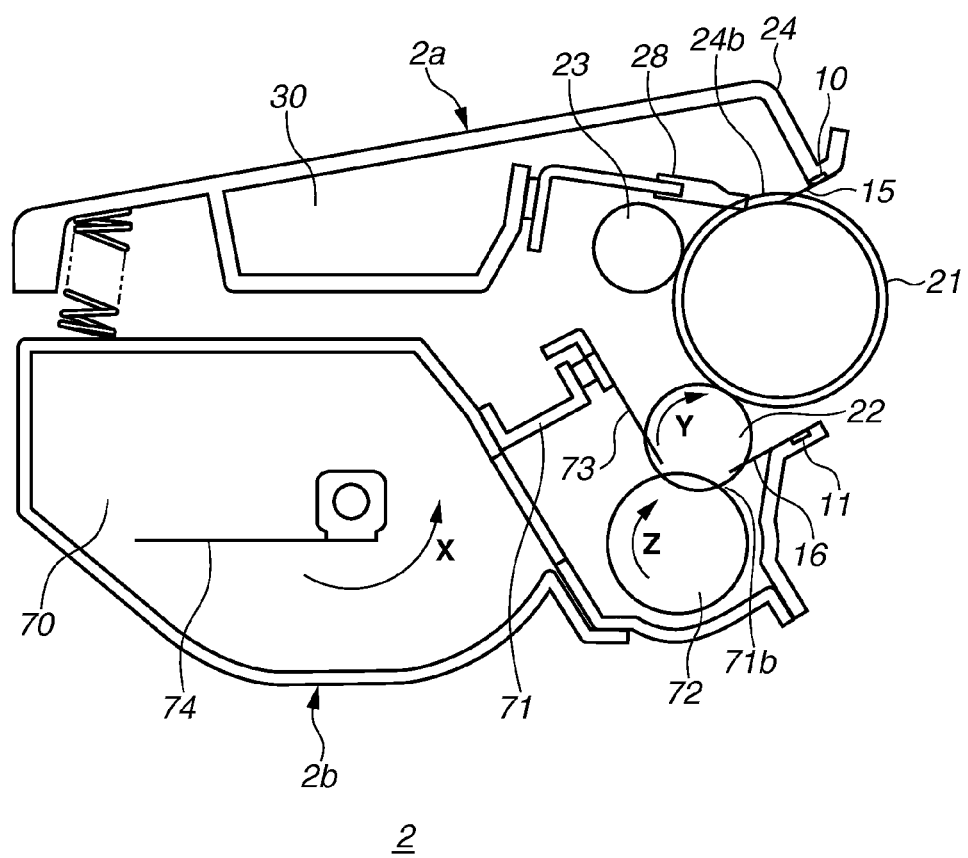
FIG. 3 is a cross-sectional view of the cartridge.

A configuration of the process cartridge 2 according to the present exemplary embodiment will be described with reference to FIGS. 2 and 3. FIG. 2 is a perspective view of the cartridge 2. FIG. 3 is a schematic sectional view of the cartridge 2 taken along the line A-A in FIG. 2. The cartridges 2 respectively for the colors Y, M, C, and Bk have substantially the same configuration. The cartridge 2 is divided into a cleaning unit 2a serving as an image bearing unit and a development unit 2b.

The cleaning unit 2a includes an image bearing member 21 (a rotation member), a charging roller 23, a cleaning container 24, a cleaning blade 28, and a scoop sheet 15. The image bearing member 21 is rotatably supported by the cleaning container 24 to overlap an opening 24b of the cleaning container 24. The charging roller 23 serving as a primary charging unit for uniformly charging a surface of the image bearing member 21 and the cleaning blade 28 for removing toner remaining on the image bearing member 21 are arranged on the circumference of the image bearing member 21. The scoop sheet 15 is a flexible sheet member for scooping the toner that has been removed by the cleaning blade 28, and is fixed to the cleaning container 24 by a resin member 10. Removed waste toner is stored in a waste toner chamber 30 (a developer storage portion) provided in the cleaning container 24.

The development unit 2b includes a developer bearing member 22 (a rotation member) serving as a development unit, a toner container 70 (a developer storage portion) storing toner, and a development container 71. The developer bearing member 22 is rotatably supported by the development container 71 to overlap an opening 71b of the development container 71. A toner supply roller 72 that rotates in a direction indicated by an arrow Z in contact with the developer bearing member 22, a developer regulation member 73, a blow prevention sheet 16 formed of a flexible sheet member, and a resin member 11 for fixing the blow prevention sheet 16 are arranged around the developer bearing member 22. A toner agitating mechanism 74 is provided in the toner container 70.

Now, an operation of the process cartridge 2 will be described. The toner agitating mechanism 74 conveys the toner in the toner container 70 to the toner supply roller 72. The toner supply roller 72 rotates in the direction indicated by the arrow Z illustrated in FIG. 2, to supply the toner to the developer bearing member 22. The toner, which has been supplied onto the developer bearing member 22, moves toward the developer regulation member 73 by rotation in a Y direction of the developer bearing member 22. The developer regulation member 73 regulates the toner to form a toner layer having a predetermined thickness while providing a desired electrification charge amount. After the toner layer formed by the developer regulation member 73 is conveyed to a development unit in which the image bearing member 21 and the developer bearing member 22 contact each other, the toner is developed on the image bearing member 21 with a development bias applied to the developer bearing member 22. After the toner, which has been developed on the image bearing member 21, is primarily transferred onto the intermediate transfer member 35, the waste toner remaining on the image bearing member 21 is removed by the cleaning blade 28, and is stored in the waste toner chamber 30.

(Cleaning Unit)

Figure 4:
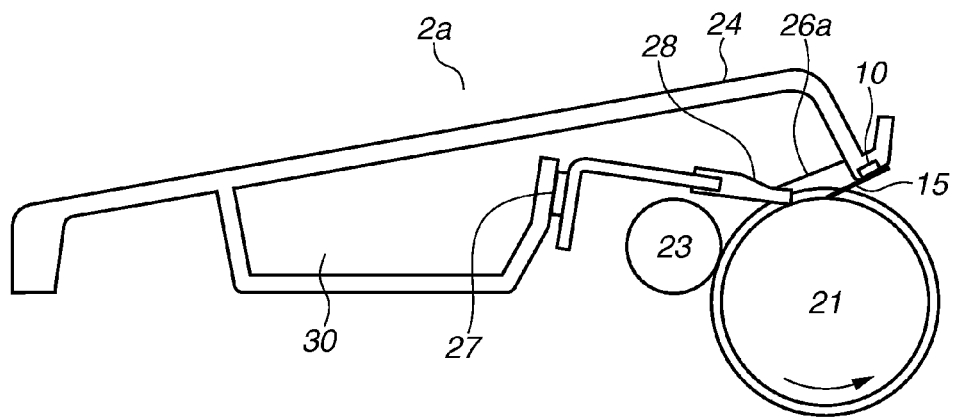
FIG. 4 is a cross-sectional view of a cleaning unit.
Figure 5A:
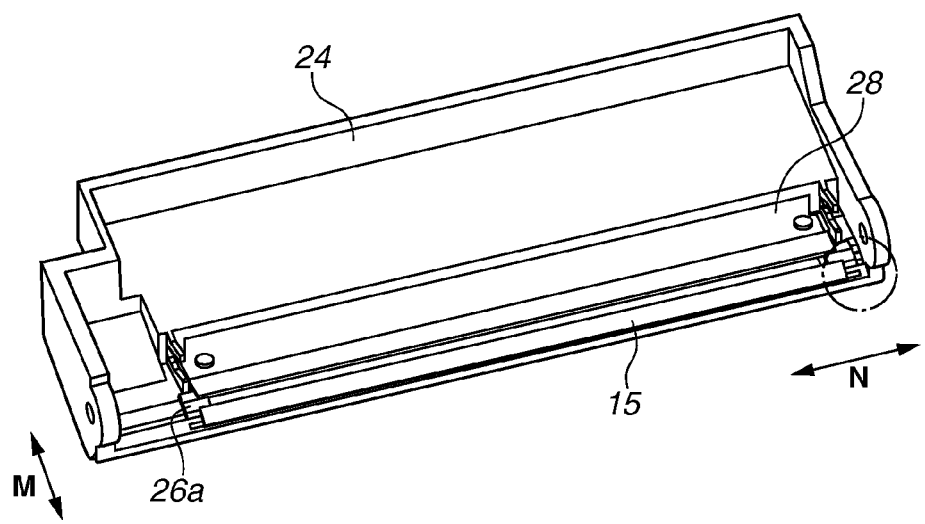
FIGS. 5A and 5B are perspective views of a part of the cleaning unit.
Figure 5B:
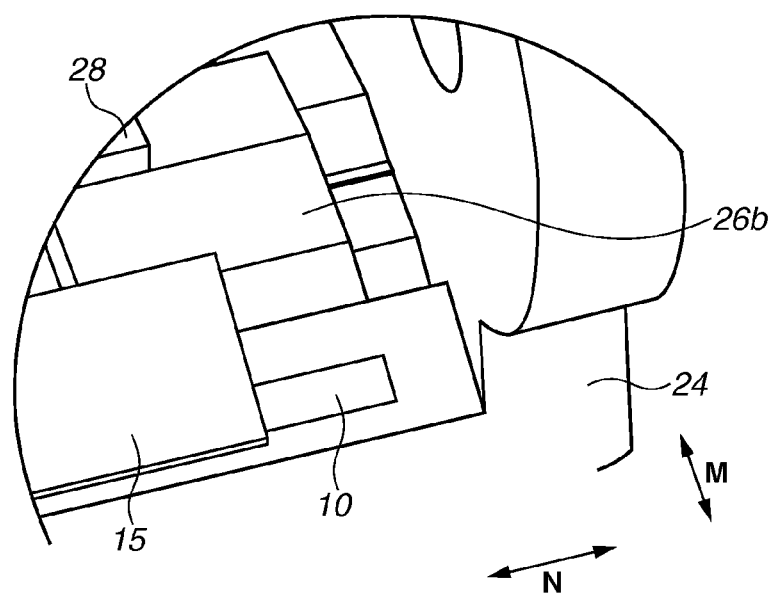

A configuration of the cleaning unit 2a according to the present exemplary embodiment will be more specifically described with reference to FIGS. 4 and 5. FIG. 4 is a cross-sectional view of the cleaning unit 2a taken along the line I-I in FIG. 2. FIG. 5A is a perspective view illustrating a part of the cleaning unit 2a. FIG. 5B is a perspective view of the vicinity of an edge of the part of the cleaning unit 2a in a longitudinal direction of FIG. 5A.

As illustrated in FIGS. 4 and 5, the cleaning container 24 includes the cleaning blade 28 that scrapes off a residual substance such as waste toner from the image bearing member 21, and the scoop sheet 15 that scoops the scraped residual substance. The cleaning container 24 further includes the waste toner chamber 30 that stores the water toner, image bearing member edge sealing members 26a and 26b arranged at both edges of the cleaning blade 28 so that the residual substance does not leak out of the waste toner chamber 30, and a cleaning blade lower seal 27. Each of the members is incorporated into the cleaning container 24 to constitute the cleaning unit 2a.

More specifically, the cleaning blade 28 and the scoop sheet 15 abut on an outer peripheral surface of the image bearing member 21 at respective positions where they do not interfere with each other. Further, the scoop sheet 15 is fixed to the cleaning container 24 while a part of the resin member 10 formed integrally with the cleaning container 24 is thermally welded. The resin member 10 is formed integrally with the cleaning container 24 by injecting thermoplastic resin having a lower coefficient of elasticity than that of the cleaning container 24 into a molded space formed by causing a mold to abut on the cleaning container 24 serving as a frame. In the present exemplary embodiment, an elastomer is used as the resin member 10.

The image bearing member edge sealing members 26a and 26b are attached, to prevent toner from leaking out of each longitudinal edge of the cleaning blade 28 and each transverse edge connecting to the longitudinal edge, as illustrated in FIG. 5, using each longitudinal edge and each transverse edge as references. The image bearing member edge sealing members 26a and 26b contact the outer peripheral surface of the image bearing member 21 and contact an edge in the longitudinal direction N of the scoop sheet 15, as illustrated in FIG. 3. Further, the cleaning blade lower seal 27 seals a gap between the cleaning blade 28 and the cleaning container 24.

(Development Unit)

Figure 6:
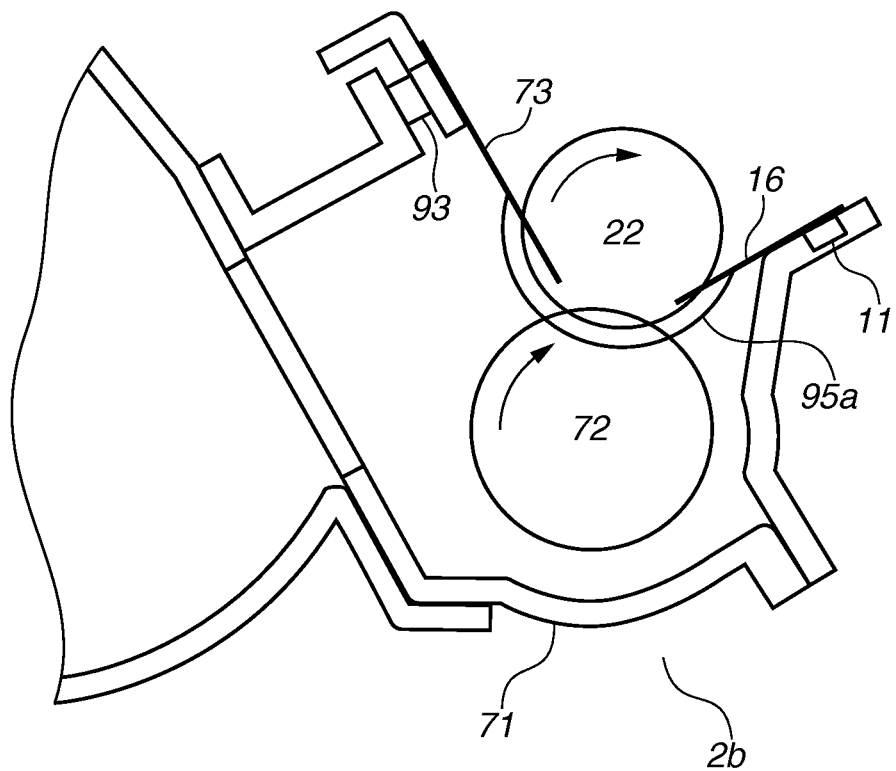
FIG. 6 is a cross-sectional view of a part of a development unit.

A configuration of the development unit 2b according to the present exemplary embodiment will be more specifically described with reference to FIGS. 6 and 7. FIG. 6 is a cross-sectional view of a part of the development unit 2b taken along the line I-I in FIG. 2. FIG. 7 is a perspective view of a part of the development unit 2b.

As illustrated in FIGS. 6 and 7, the development unit 2b includes the developer regulation member 73 that smoothes toner in the developer bearing member 22, and the blow prevention sheet 16 that prevents toner from blowing off from the gap between the developer bearing member 22 and the development container 71. The development unit 2b further includes the development container 71 that stores the toner, developer bearing member edge sealing members 95a and 95b arranged at both edges of the developer regulation member 73 so that the toner does not leak out of the development container 71, and a development blade lower seal 93. Each of the members is incorporated into the development container 71 to constitute the development unit 2b.

More specifically, the developer regulation member 73 and the blow prevention sheet 16 abut on an outer peripheral surface of the developer bearing member 22 at respective positions where they do not interfere with each other. Further, the blow prevention sheet 16 is fixed to the development container 71 while a part of the resin member 11 formed integrally with the development container 71 is thermally welded. The resin member 11 is formed integrally with the development container 71 by injecting thermoplastic resin having a lower coefficient of elasticity than that of the development container 71 into a molded space formed by causing a mold to abut on the developer container 71 serving as a frame, like the resin member 10. In the present exemplary embodiment, an elastomer is used as the resin member 11.

The developer bearing member edge sealing members 95a and 95b contact the outer peripheral surface of the developer bearing member 22, as illustrated in FIG. 6, and contact edges in the longitudinal direction N of the developer regulation member 73 and the blow prevention sheet 16, as illustrated in FIG. 7. Further, the development blade lower seal 93 seals a gap between the developer regulation member 73 and the development container 71.

(Reproduction of Cartridge)

Reproduction of the cartridge 2 will be described below.

The cartridge 2, commercial value of which has been lost because toner has been consumed, is recovered and is reproduced via a reproduction process. In the reproduction process, a decomposed component is examined, and when the examined decomposed component is rejected, the component is replaced with a new component, as needed. At this time, if a sheet member for preventing toner from leaking out swells, and the toner cannot be regulated from leaking out by the swell, the present exemplary embodiment is applied. When a cartridge is newly manufactured, if a sheet member swells, and toner leaks out of the manufactured cartridge, the present exemplary embodiment can also be applied as well.

A thin plate member (sheet member) for sealing toner is provided in each of the cleaning unit 2a and the development unit 2b in the process cartridge 2. A case where the cleaning unit 2a is reproduced will be described by way of example. The configuration of the development unit 2b is similar to that of the cartridge 2 that has not been reproduced, and hence description thereof is omitted. A configuration of a reproduced cartridge will be described, while focusing on a reproduced cleaning unit 3a.

(Reproduced Cartridge)

Figure 8A:
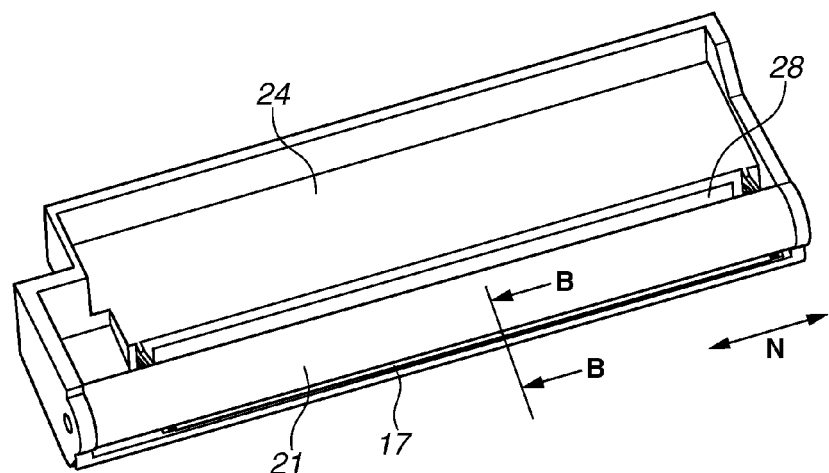
FIGS. 8A and 8B each illustrate a part of a cleaning unit according to a first exemplary embodiment.
Figure 8B:
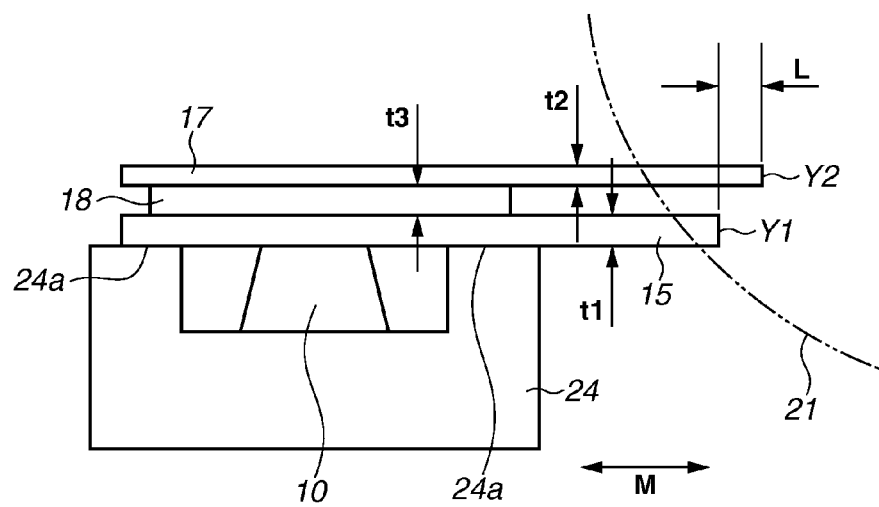

A configuration of the reproduced cartridge will be described with reference to FIGS. 8A and 8B. In the present exemplary embodiment, the configuration according to the present exemplary embodiment is applied to a sealing member in the reproduced cleaning unit 3a. FIG. 8A is a perspective view of a part of the reproduced cleaning unit 3a. FIG. 8B illustrates a cross section of the vicinity of the sealing member in the reproduced cleaning unit 3a illustrated in FIG. 8A taken along the line B-B.

In the reproduced cleaning unit 3a, a scoop sheet 17 (a second sheet member), which is a flexible sheet member, is fixed onto the scoop sheet 15 (a first sheet member) fixed to the cleaning container 24 with the resin member 10, via a connecting member 18. The connecting member 18 is formed on the scoop sheet 15 to extend in the longitudinal direction N. In a transverse direction M, at least a part of the connecting member 18 may be provided on a fixing surface 24a (a seating surface) or the resin member 10. The transverse direction M is a direction perpendicular to the longitudinal direction N, and specifies a plane parallel to the longitudinal direction N and the fixing surface 24a in fixing the scoop sheet 15.

The scoop sheet 17 is arranged so that an edge thereof projects onto an opening 24b of the cleaning container 24, in a similar manner as the scoop sheet 15. At this time, the scoop sheet 17 is attached so that a leading edge position Y2 of the scoop sheet 17 in a direction toward the image bearing member 21 projects farther than a leading edge position Y1 of the scoop sheet 15 in the direction toward the image bearing member 21, as illustrated in FIG. 8B. In the present exemplary embodiment, the projection amount L is 0.5 mm.

When the scoop sheets 15 and 17 of the same material are used, for example, a thickness t2 of the scoop sheet 17 is preferably made smaller than a thickness t1 of the scoop sheet 15. In the present exemplary embodiment, the thickness t1 of the scoop sheet 15 is set to 0.050 mm, and the thickness t2 of the scoop sheet 17 is set to 0.038 mm. However, the present invention is not limited to this. When the thickness t2 of the scoop sheet 17 is made equal to or larger than the thickness t1 of the scoop sheet 15, the coefficient of elasticity of the scoop sheet 17 is preferably lower than the coefficient of elasticity of the scoop sheet 15. In this case, the scoop sheet 15 having a thickness t1 of 0.050 mm and a coefficient of elasticity of 4 GPa, and the scoop sheet 17 having a thickness t2 of 0.070 mm and a coefficient of elasticity of 3 GPa can be used.

In the present exemplary embodiment, as a distance of a location of the scoop sheet 17 fixed to the cleaning container 24 via the connecting member 18 from the image bearing member 21 in the transverse direction M increases, abutment pressure between the image bearing member 21 and the scoop sheet 17 can be reduced. More specifically, a portion of the scoop sheet 17 closer to the image bearing member 21 and a portion of the scoop sheet 17 farther than the image bearing member 21 than a central position at which the length of the fixing surface 24a is divided into two parts in the transverse direction M may be fixed to the cleaning container 24 via the connecting member 18, respectively, when the abutment pressure is increased and when the abutment pressure is decreased.

(Effect)

The above-mentioned configuration enables the scoop sheet 17 to suppress leakage of toner from a gap between the image bearing member 21 and the cleaning container 24 even when the scoop sheet 15 swells.

The scoop sheet 17 is arranged on the upstream side of the scoop sheet 15 in a rotational direction while a part of the scoop sheet 17 contacting the image bearing member 21 separates from the fixing surface 24a. Thus, the leading edge position Y2 of the scoop sheet 17 projects toward the image bearing member 21 farther than the leading edge position Y1 of the scoop sheet 15. As a result, the abutment pressure on the image bearing member 21 when the scoop sheet 17 is provided becomes higher than that when only the scoop sheet 15 is provided. In this regard, the abutment pressure on the image bearing member 21 can be set to a desired pressure by changing the thickness and the coefficient of elasticity of the scoop sheet 17.

Further, when an arrangement of the connecting member 18 for fixing the scoop sheet 17 to the cleaning container 24 is adjusted in a range of a length of the fixing surface 24a in the transverse direction M, the abutment pressure on the image bearing member 21 can be adjusted. More specifically, the abutment pressure on the image bearing member 21 can be easily adjusted by changing a position to which the scoop sheet 17 is fixed.

(Method for Reproducing Cartridge)

A method for reproducing the cleaning unit 2a illustrated in FIGS. 8A and 8B will be described below.

The cleaning unit 2a is firstly taken out. When the cartridge 2 is formed, the cartridge 2 is decomposed into the cleaning unit 2a and the development unit 2b, to prepare the cleaning unit 2a. The image bearing member 21 is detached from the cleaning unit 2a. Then, if a surface of the scoop sheet 15 is soiled with toner, the surface is cleaned.

Figure 9:
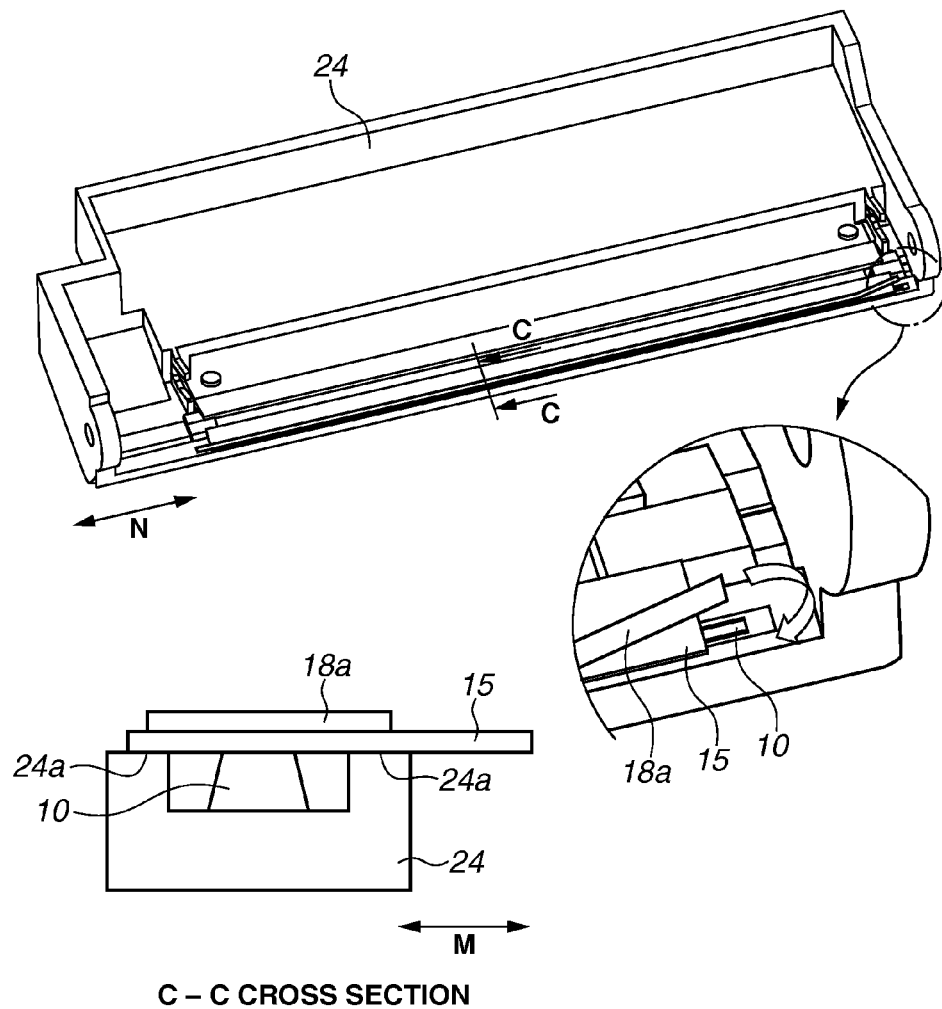
FIG. 9 illustrates an assembling process of the cleaning unit according to the first exemplary embodiment.
Figure 10:
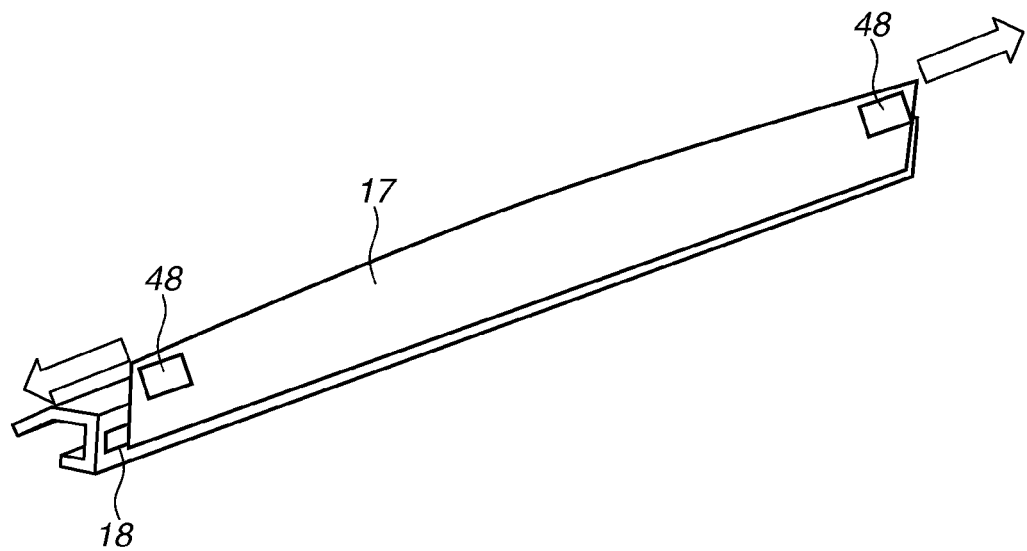
FIG. 10 illustrates an attaching process of a scoop sheet according to the first exemplary embodiment.

As illustrated in FIG. 9, a two-sided adhesive tape 18a is affixed as the connecting member 18 onto the scoop sheet 15. As illustrated in FIG. 10, the scoop sheet 17 is affixed onto the two-sided adhesive tape 18a serving as the connecting member 18 while tension is applied to the scoop sheet 17 so that the scoop sheet 17 does not swell. In the present exemplary embodiment, the scoop sheet 17 is affixed onto the connecting member 18 while a predetermined amount of tension is applied thereto using a sheet extension tool 48. However, it is not limited to this, and any method may be used as long as the scoop sheet 17 does not swell.

The image bearing member 21 is attached to the cleaning container 24 to which the scoop sheet 17 has been attached, to form the reproduced cleaning unit 3a illustrated in FIGS. 8A and 8B. The reproduced cleaning unit 3a is integrated with the development unit 2b to complete the reproduced cartridge.

In the present exemplary embodiment, the two-sided adhesive tape 18a is used as the connecting member 18. However, it is not limited to this. For example, an adhesive member such as a liquid adhesive may be used as the connecting member 18. Further, in the present exemplary embodiment, the connecting member 18 is arranged on the scoop sheet 15, and then the scoop sheet 17 is arranged. However, it is not limited to this. For example, the scoop sheet 17, to which the connecting member 18 has been previously fixed, may be prepared and fixed onto the scoop sheet 15.

(Effect)

With the above-mentioned configuration, the scoop sheet 17 serving as a new sealing member can be simply attached to the cleaning container 24 without detaching the scoop sheet 15. As a result, the step of detaching the scoop sheet 15 and the step of forming the fixing surface 24a for fixing the scoop sheet 17 are eliminated, so that productivity can be improved. At the same time, leakage of toner to the outside from the reproduced cleaning unit 3a is more suppressed while an effect of abutment pressure between the sealing member and the image bearing member 21 on an image can be reduced.

(First Modified Example)

In the first exemplary embodiment, the two-sided adhesive tape 18a is used as the connecting member 18. However, it is not limited to this. For example, a hot-melt material, which is melted by heat, may be used. A method for reproducing a cartridge will be described below, while focusing on a difference from the first exemplary embodiment.

Similar to the first exemplary embodiment, the cleaning unit 2a is taken out, the image bearing member 21 is detached, and the surface of the scoop sheet 15 is cleaned. A sheet-like hot-melt material 18b as the connecting member 18 is arranged on the scoop sheet 15. Then, the scoop sheet 17 is temporarily placed on the hot-melt material 18b while tension is applied to the scoop sheet 17 using the sheet extension tool 48. When a heat bar 50 is pressed, as illustrated in FIG. 11, from a surface of the scoop sheet 17, to melt the hot-melt material 18b, thereby affixing the scoop sheet 17 to the scoop sheet 15.

Finally, the image bearing member 21 is attached to the cleaning container 24, to which the scoop sheet 17 has been attached, to form the reproduced cleaning unit 3a, similar to the first exemplary embodiment. The reproduced cleaning unit 3a is integrated with the development unit 2b, to complete the reproduced cartridge.

(Effect)

With the above-mentioned configuration, a similar effect to that in the first exemplary embodiment can be obtained. Further, according to the present modified example, the cartridge can be reproduced without the step of affixing an adhesive member. Thus, positional accuracy of the scoop sheet 17 relative to the cleaning container 24 can be improved.

(Second Modified Example)

The two-sided adhesive tape 18a is used as the connecting member 18 in the first exemplary embodiment. However, it is not limited to this. The connecting member 18 need not be an adhesive member. For example, a near-infrared absorber 18c may be used as the connecting member if materials, which are integrated when melted, are respectively used as the scoop sheet 17 and the scoop sheet 15 and the material for the scoop sheet 17 transmits a laser beam (near-infrared rays).

A method for reproducing a cartridge will be described below, while focusing on a difference from the first exemplary embodiment. More specifically, polyester, which transmits 85% of near infrared rays (e.g., wavelength of 960 nm), is used as the scoop sheet 15 and the scoop sheet 17 in the present modified example. The same material is used for the scoop sheet 15 and the scoop sheet 17. Thus, the scoop sheet 15 and the scoop sheet 17 have compatibility so that they are integrated when melted.

Similar to the first exemplary embodiment, the cleaning unit 2a is taken out, the image bearing member 21 is detached, and the surface of the scoop sheet 15 is cleaned. The near-infrared absorber 18c is applied as the connecting member 18 onto the scoop sheet 15. While carbon black is used as the near-infrared absorber 18c, a material other than carbon black may be used if it is a near-infrared absorber.

Figure 12:
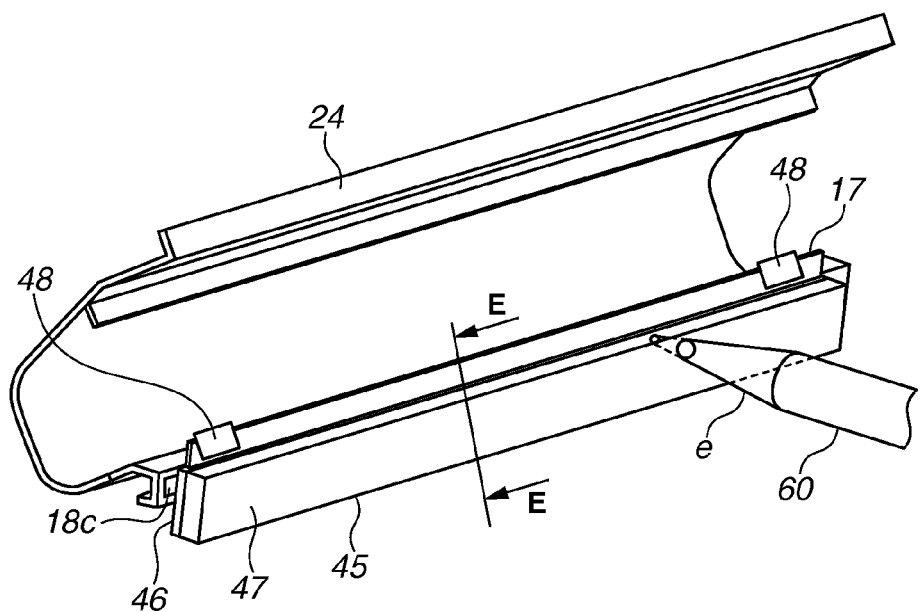
FIG. 12 illustrates a second modified example of the manufacturing method according to the first exemplary embodiment.
Figure 13A:
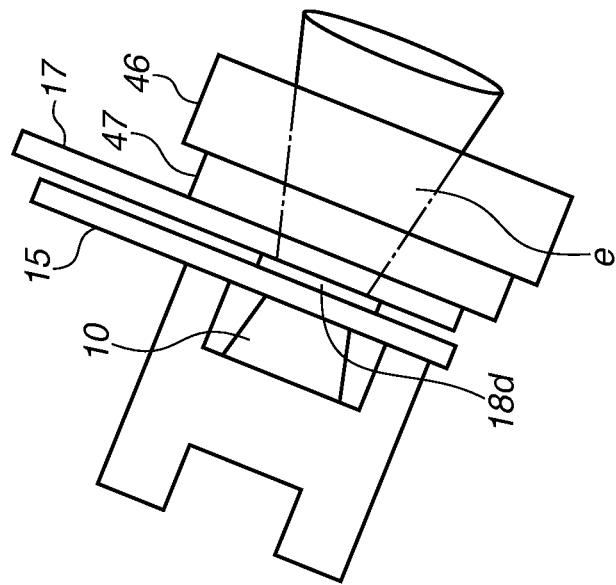
FIGS. 13A and 13B are detailed views illustrating the second modified example of the manufacturing method according to the first exemplary embodiment.
Figure 13B:
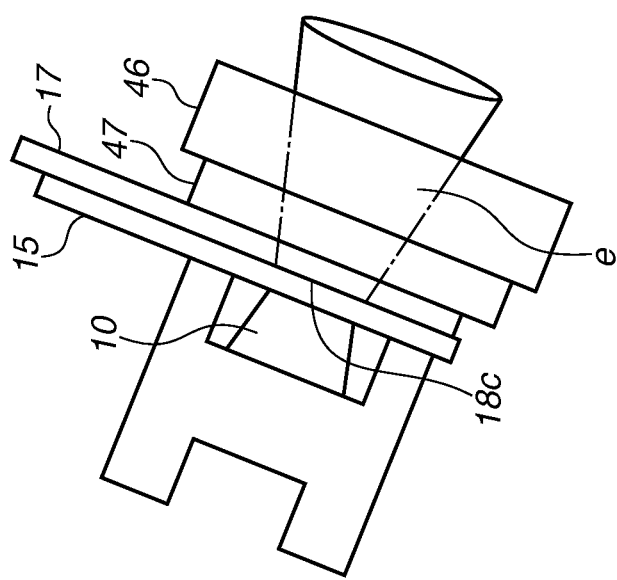

The scoop sheet 17 is then temporarily placed on the scoop sheet 15, which has been coated with the near-infrared absorber 18c as the connecting member 18, while tension is applied to the scoop sheet 17 using the sheet extension tool 48. The scoop sheet 17 and the scoop sheet 15 are then pressed against each other using a pressing jig 45, as illustrated in FIGS. 12 and 13A, and are irradiated with a near-infrared laser beam e from a laser irradiation head 60. FIGS. 13A and 13B illustrate a cross section of the vicinity of a sealing member taken along the line E-E in FIG. 12. At this time, the laser beam e absorbed by the near-infrared absorber 18c is converted into heat, to generate the heat between the scoop sheet 15 and the scoop sheet 17. The scoop sheet 15 and the scoop sheet 17 are melted by the heat, and are joined to each other by the resin being mixed with each other. Near-infrared rays have a wavelength of 960 nm, an output power of 20 W, and a spot diameter ø on a surface of the resin member 10 of 1.5 mm, and has a scanning speed in the longitudinal direction N of 50 mm/sec. The energy density on a surface, contacting the scoop sheet 17, of the near-infrared absorber 18c is 0.22 J/mm².

According to the present modified example, the pressing jig 45 includes a rigid member 46 having rigidity and an elastic member 47 having elasticity. The scoop sheet 17 is elastically pressed against the scoop sheet 15 attached to the cleaning container 24 using the rigidity member 46 via the elastic member 47 so that adhesiveness between the scoop sheet 17 and the scoop sheet 15 can be improved. Further, positional deviation of the scoop sheet 17 can be prevented.

More specifically, the rigid member 46 formed of acrylic, and the elastic member 47 formed of silicone rubber having a thickness of 5 mm are integrated with each other as the pressing jig 45.

Finally, the image bearing member 21 is attached to the cleaning container 24, to which the scoop sheet 17 has been attached, to form the reproduced cleaning unit 3a, similar to the first exemplary embodiment. The reproduced cleaning unit 3a is integrated with the development unit 2b, to complete the reproduced cartridge.

A case where materials, which are integrated when melted, are respectively used as the scoop sheet 17 and the scoop sheet 15 has been described in the present modified example. Even if the scoop sheet 17 and the scoop sheet 15 are respectively made of materials, which are not integrated when melted, however, the cartridge can be formed, similar to the present modified example, by using a hot-melt material 18d containing a near-infrared absorber as the connecting member 18. More specifically, a sheet formed of the hot-melt material 18d containing the near-infrared absorber is arranged on the scoop sheet 15 as the connecting member 18 instead of the near-infrared absorber 18c being applied as the connecting member 18 onto the scoop sheet 15, as illustrated in FIG. 13B. Thus, the scoop sheet 17 transmits the near-infrared laser beam e, and the hot-melt material 18d is melted so that the scoop sheet 17 can be fixed onto the scoop sheet 15, similar to the first exemplary embodiment.

(Effect)

With the above-mentioned configuration, a similar effect to that in the first exemplary embodiment can be obtained. Further, according to the present modified example, positional accuracy of the scoop sheet 17 relative to the cleaning container 24 can be improved because the scoop sheet 17 is irradiated with laser while being positioned in the cleaning container 24 by the pressing jig 45 and fixed.

(Third Modified Example)

Figure 14A:
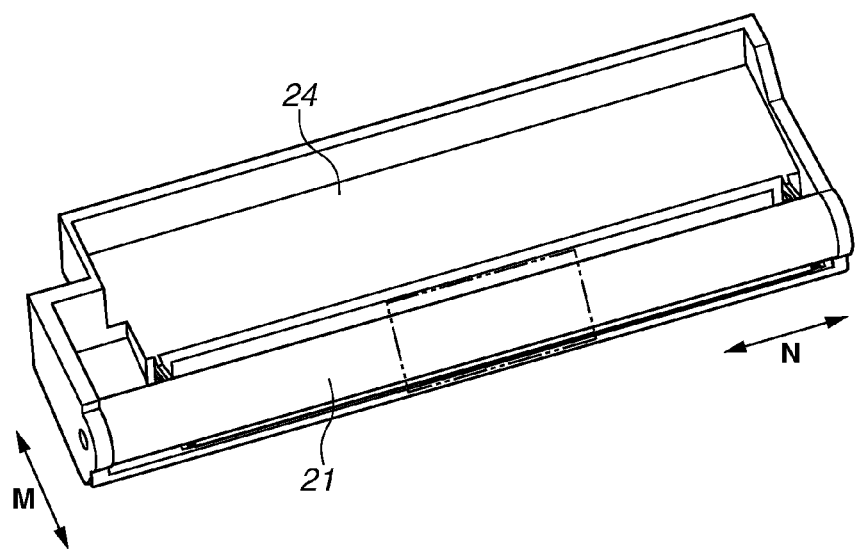
FIGS. 14A and 14B illustrate a configuration to which a third modified example of the manufacturing method according to the first exemplary embodiment has not yet been applied.
Figure 14B:
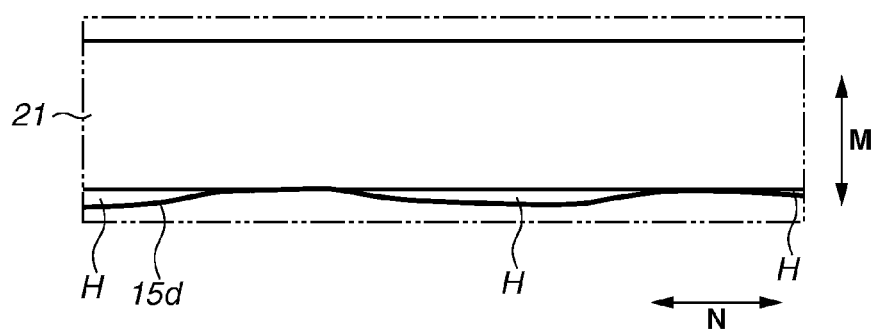
Figure 15A:
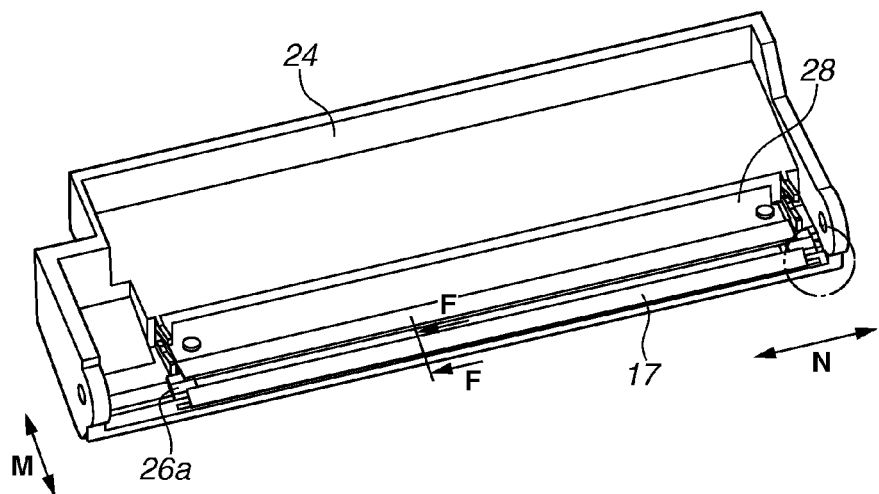
FIGS. 15A and 15B illustrate the third modified example of the manufacturing method according to the first exemplary embodiment.
Figure 15B:
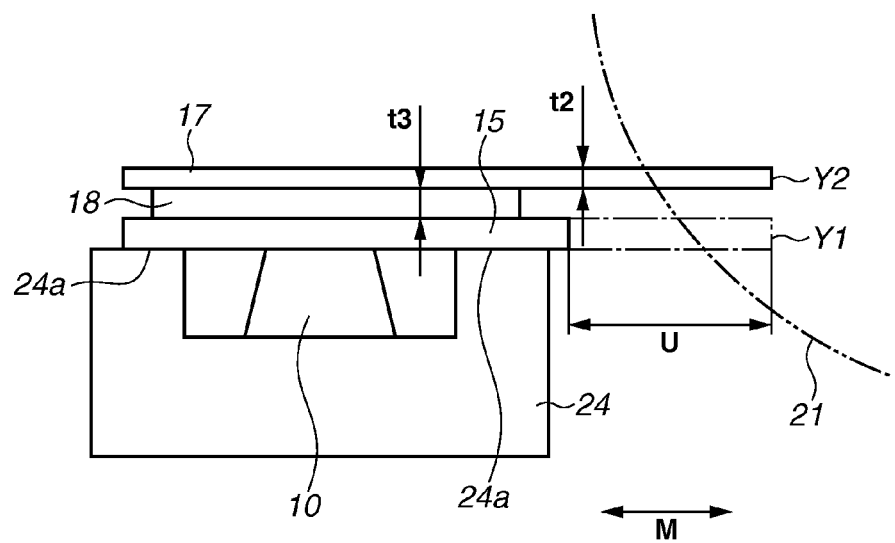

In the first exemplary embodiment, the scoop sheet 17 is fixed to the scoop sheet 15 to provide a projection amount L in a direction toward the image bearing member 21 in the transverse direction M, after the cleaning unit 2a is taken out, the image bearing member 21 is detached, and the surface of the scoop sheet 15 is cleaned. However, it is not limited to this. An edge, in the direction toward the image bearing member 21, of the scoop sheet 15 may be removed in the transverse direction M. This configuration will be described with reference to FIGS. 14A, 14B, 15A, and 15B. FIG. 14A illustrates that the scoop sheet 15, which has swollen, abuts on the image bearing member 21. FIG. 14B is a top view of an abutment portion between the scoop sheet 15 and the image bearing member 21 in FIG. 14A. FIG. 15A is a perspective view illustrating a configuration in which the scoop sheet 15 is removed by any amount. FIG. 15B illustrates a cross section taken along the line F-F in FIG. 15A.

As illustrated in FIGS. 14A and 14B, in the first exemplary embodiment, when the scoop sheet 15, which has swollen, contacts the image bearing member 21, there is a gap H. Thus, a toner layer is thinned in the abutment portion between the scoop sheet 15 and the image bearing member 21. On the other hand, a toner layer is thickened in a non-abutment portion which is the gap H. As a result, non-uniformity in density may occur in an image. Therefore, in the first exemplary embodiment, the scoop sheet 17 is attached so that the leading edge position Y2 of the scoop sheet 17 projects farther than the leading edge position Y1 of the scoop sheet 15 in the direction toward the image bearing member 21 to suppress the non-uniformity in the thickness of the toner layer formed in the image bearing member 21.

On the other hand, in the present modified example, the step of removing the edge, in the direction toward the image bearing member 21, of the scoop sheet 15 in the transverse direction M is provided. More specifically, the cleaning unit 2a is taken out, the image bearing member 21 is detached, and the edge, in the direction toward the image bearing member 21, of the scoop sheet 15 is then cut by a length U and removed in the transverse direction M. The surface of the scoop sheet 15 may be cleaned either before or after the step of removing the scoop sheet 15.

After the scoop sheet 17 is caused to adhere to the scoop sheet 15 via the connecting member 18, the image bearing member 21 is attached to the cleaning container 24, to form the reproduced cleaning unit 3a. The reproduced cleaning unit 3a is integrated with the development unit 2b, to complete the reproduced cartridge.

(Effect)

With the above-mentioned configuration, a similar effect to that according to the first exemplary embodiment can be obtained. Further, according to the present modified example, the degree of freedom of an arrangement in the transverse direction M of the scoop sheet 17 can be improved.

In the first exemplary embodiment, the case where the cleaning unit 2a is reproduced has been described. However, it is not limited to this. The invention may be applied to a development unit 2b in a process cartridge 2. As a configuration different from that in the first exemplary embodiment, a configuration of a reproduced cartridge according to a second exemplary embodiment will be described, while focusing on a reproduced development unit 2b.

(Reproduced Cartridge)

Figure 16A:
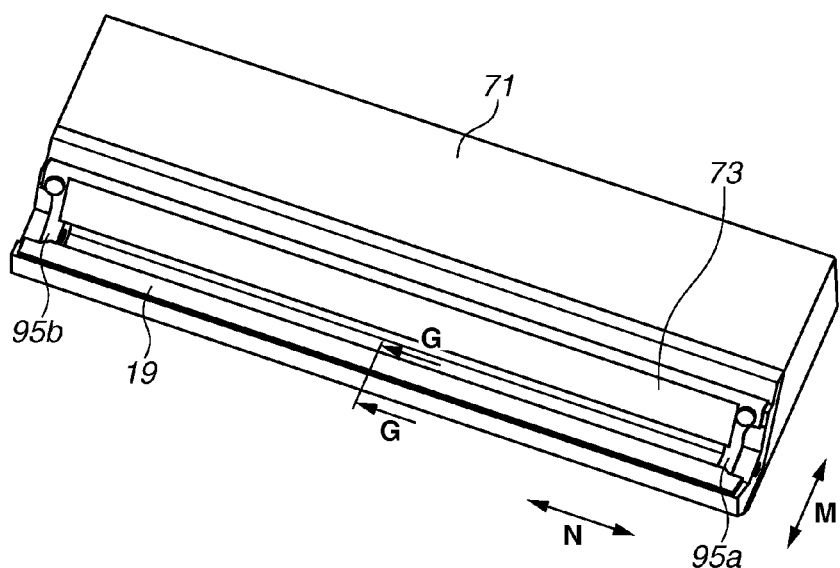
FIGS. 16A and 16B each illustrate a part of a development unit according to a second exemplary embodiment.
Figure 16B:
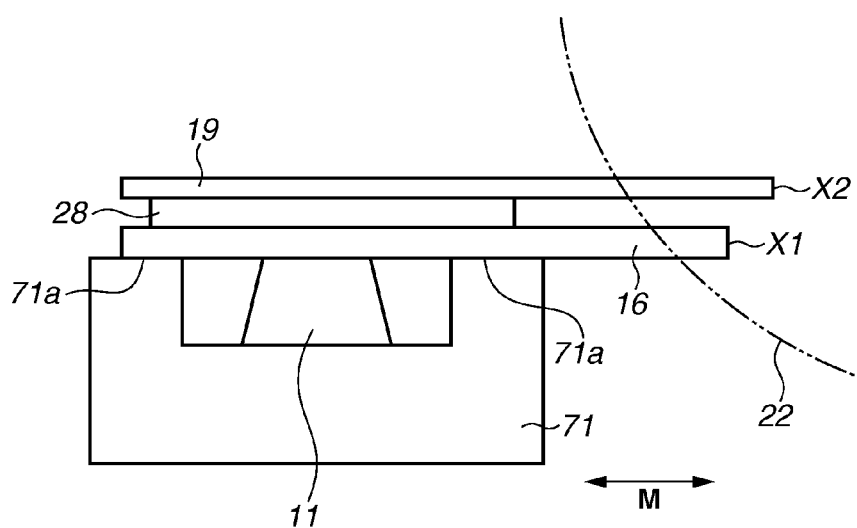

The configuration of the reproduced cartridge will be described with reference to FIGS. 16A and 16B. In the present exemplary embodiment, the configuration according to the present invention is applied to a sealing member in a development unit. FIGS. 16A and 16B are a schematic configuration diagram illustrating a sealing member in a development unit according to the present exemplary embodiment.

In a reproduced development unit 3b, a blow prevention sheet 19 (a second sheet member), which is a flexible sheet member, is fixed onto a blow prevention sheet 16 (a first sheet member) fixed to a development unit 71 with a resin member 11, via a connecting member 28. The connecting member 28 is formed on the blow prevention sheet 16 to extend in a longitudinal direction N. In a transverse direction M, the connecting member 28 may be provided on a fixing surface 71a (a seating surface). The transverse direction M is a direction perpendicular to the longitudinal direction N, and specifies a plane parallel to the longitudinal direction N and the fixing surface 71a in fixing the blow prevention sheet 16.

As illustrated in FIG. 16B, the blow prevention sheet 19 is arranged so that one edge thereof projects onto an opening of the development container 71, in a similar manner as the blow prevention sheet 16. At this time, the blow prevention sheet 19 is attached so that a leading edge position X2 of the blow prevention sheet 19 in a direction toward a developer carrying member 22 projects farther than a leading edge position X1 of the blow prevention sheet 16 in the direction toward the developer bearing member 22.

(Effect)

The above-mentioned configuration enables the blow prevention sheet 19 to suppress leakage of toner from an area between the developer bearing member 22 and the development container 71 even when the blow prevention sheet 16 swells.

An abutment pressure on the developer bearing member 22 when the blow prevention sheet 19 is provided becomes higher than that when only the blow prevention sheet 16 is provided, similar to the first exemplary embodiment. In this regard, the abutment pressure on the developer bearing member 22 can be set to a desired pressure by changing the thickness and the coefficient of elasticity of the blow prevention sheet 19.

Further, when an arrangement of the connecting member 28 for fixing the blow prevention sheet 19 to the development container 71 is adjusted in a range of a length of the fixing surface 71a in the transverse direction M, the abutment pressure on the developer bearing member 22 can be adjusted. More specifically, the abutment pressure on the developer bearing member 22 can be easily adjusted by changing a position to which the blow prevention sheet 19 is fixed.

(Method for Reproducing Cartridge)

A method for reproducing the development unit 2b illustrated in FIGS. 16A and 16B will be described below.

The development unit 2b is firstly taken out. When the cartridge 2 is formed, the cartridge 2 is decomposed into the cleaning unit 2a and the development unit 2b to prepare the development unit 2b. The developer bearing member 22 is detached from the development unit 2b. Then, if a surface of the blow prevention sheet 16 is soiled with toner, the surface is cleaned.

The blow prevention sheet 19 is affixed onto the blow prevention sheet 16 via the connecting member 28 while tension is applied to the blow prevention sheet 19 so that the blow prevention sheet 19 does not swell.

The developer bearing member 22 is attached to the development container 71 to which the blow prevention sheet 19 has been attached, to form the reproduced development unit 3b illustrated in FIGS. 16A and 16B. The reproduced development unit 3b is integrated with the cleaning unit 2a, to complete the reproduced cartridge.

(Effect)

The above-mentioned configuration enables the blow prevention sheet 19 serving as a new sealing member to be simply attached to the development container 71 without detaching the blow prevention sheet 16. As a result, productivity can be improved by eliminating the step of detaching the blow prevention sheet 16 and the step of forming the fixing surface 71a for fixing the blow prevention sheet 19. At the same time, leakage of toner toward the outside from the reproduced cleaning unit 3a can be more suppressed while an effect of abutment pressure between the sealing member and the developer bearing member 22 on an image can be reduced.

Changes similar to those in the first to third modified examples can also be applied to the second exemplary embodiment. Similar effects to those in the first to third modified examples can also be obtained by adding the changes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-157756, filed Aug. 1, 2014, which is hereby incorporated by reference herein in its entirety.

What is claimed is:

1. A method for manufacturing a cartridge attachable to and detachable from a main body of an image forming apparatus, the method comprising:
    preparing a unit that includes a frame including a developer storage unit storing developer and an opening connecting to the outside from the developer storage unit, and a first sheet member including one surface and an other surface, the one surface being a surface for attachment to the frame, the other surface being an opposite surface;
    fixing a second sheet member to the first sheet member via a connecting member such that the connecting member is in contact with the other surface of the first sheet member and in contact with the second sheet member, and
    attaching a rotation member onto the opening so that the rotation member abuts on the second sheet member,
    wherein the second sheet member projects in a direction toward the rotation member farther than the first sheet member.

2. The method according to claim 1, further comprising removing at least a part of the first sheet member so that the second sheet member projects in the direction toward the rotation member farther than the first sheet member.

3. The method according to claim 1, wherein the second sheet member is thinner than the first sheet member.

4. The method according to claim 1,
wherein the connecting member is formed of a material that absorbs a laser beam, and the second sheet member is formed of a material that transmits the laser beam, and
wherein the fixing of the second sheet member includes irradiating the connecting member and the second sheet member with the laser beam.

5. The method according to claim 1, wherein the connecting member is thermoplastic resin.

6. The method according to claim 1, further comprising attaching the first sheet member to the frame with a resin member.

7. The method according to claim 6, further comprising forming the resin member integrally with the frame,
wherein the resin member is thermoplastic resin.

8. The method according to claim 1, wherein the rotation member is an image bearing member, the frame is a cleaning container configured to store developer removed from the image bearing member, and each of the first sheet member and the second sheet member is a flexible sheet member abutting on the image bearing member.

9. The method according to claim 1, wherein the rotation member is a developer bearing member, the frame is a development container configured to supply developer to the developer bearing member, and each of the first sheet member and the second sheet member is a flexible sheet member abutting on the developer bearing member.

10. A cartridge attachable to and detachable from a main body of an image forming apparatus, the cartridge comprising:
a frame including a developer storage unit for storing developer and an opening connecting to the outside from the developer storage unit;
a rotation member rotatably supported by the frame on the opening;
a first sheet member including one surface and an other surface, the one surface being a surface for attachment to the frame, the other surface being an opposite surface;
a second sheet member abutting on the rotation member and fixed to the first sheet member via a connecting member such that the connecting member is in contact with the other surface of the first sheet member and in contact with the second sheet member,
wherein the second sheet member projects in a direction toward the rotation member farther than the first sheet member.

11. The cartridge according to claim 10, wherein the second sheet member is thinner than the first sheet member.

12. The cartridge according to claim 10, wherein the connecting member is formed of a material that absorbs a laser beam, and the second sheet member is formed of a material that transmits the laser beam.

13. The cartridge according to claim 10, wherein the connecting member is thermoplastic resin.

14. The cartridge according to claim 10, wherein the first sheet member is attached to the frame with a resin member.

15. The cartridge according to claim 14, wherein the resin member is thermoplastic resin, and is formed integrally with the frame.

16. The cartridge according to claim 10, wherein the rotation member is an image bearing member, the frame is a cleaning container configured to store developer removed from the image bearing member, and each of the first sheet member and the second sheet member is a flexible sheet member abutting on the image bearing member.

17. The cartridge according to claim 10, wherein the rotation member is a developer bearing member, the frame is a development container configured to supply developer to the developer bearing member, and each of the first sheet member and the second sheet member is a flexible sheet member abutting on the developer bearing member.

18. The cartridge according to claim 10, wherein the connecting member is disposed between the first sheet member and the second sheet member.

* * * * *